United States Patent
Smee et al.

(10) Patent No.: US 7,881,339 B2
(45) Date of Patent: Feb. 1, 2011

(54) METHOD AND APPARATUS FOR ASSIGNING USERS TO USE INTERLACES IN A WIRELESS CELLULAR COMMUNICATION SYSTEM

(75) Inventors: John Edward Smee, San Diego, CA (US); Jilei Hou, Carlsbad, CA (US); Kiran Kiran, La Jolla, CA (US); Naga Bhushan, San Diego, CA (US); Rashid Ahmed Akbar Attar, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 482 days.

(21) Appl. No.: 10/960,312

(22) Filed: Oct. 6, 2004

(65) Prior Publication Data

US 2006/0072533 A1   Apr. 6, 2006

(51) Int. Cl.
*H04J 3/16* (2006.01)
(52) U.S. Cl. .................. 370/468; 370/458; 370/459; 455/452.1; 455/516; 455/63.1
(58) Field of Classification Search ............. 370/342, 370/252, 253, 324, 277, 320, 330, 310.2, 370/328, 332, 334, 349, 338, 350, 394, 395.1, 370/395.53, 347, 441, 458, 459, 474, 468, 370/335, 512, 503, 506, 507, 337, 341, 280, 370/329, 336, 321, 235, 437, 465, 312, 322, 370/317, 436, 376; 375/147, 133, 346; 455/550.1, 455/575.1, 424, 425, 561, 500, 161.2, 456.5, 455/456.6, 436, 452.1, 434, 435.1, 63.1, 455/67.11, 515, 525, 277.2, 278.1, 435.2, 455/450, 456.3, 456.2, 456.1, 458, 135, 161.3, 455/179.1, 277.1, 433, 435.3, 437, 438, 516, 455/296
See application file for complete search history.

(56) References Cited

U.S. PATENT DOCUMENTS 5,123,029 A  *  6/1992  Bantz et al. ................. 375/133
5,202,056 A  *  4/1993  Sung et al. ..................... 516/40
5,384,777 A  *  1/1995  Ahmadi et al. .............. 370/337

(Continued)

FOREIGN PATENT DOCUMENTS

EP         1 489 773         12/2004

(Continued)

OTHER PUBLICATIONS

Kumaran et al. "Uplink scheduling in CDMA packet-data systems," INFOCOM 2003. Twenty-Second Annual Joint Conference of the IEEE Computer and Communications Societies. IEEE vol. 1, Mar. 30-Apr. 3, 2003, pp. 292-300.

(Continued)

*Primary Examiner*—Duc Nguyen
*Assistant Examiner*—Charles Chow
(74) *Attorney, Agent, or Firm*—D. Scott Juneau

(57) ABSTRACT

Methods and apparatuses to selectively assign interlace preference factors to a plurality of user terminals to use a plurality of interlaces. These methods and apparatuses may improve capacity compared to a system that allows each user terminal to transmit data in every interlace.

52 Claims, 7 Drawing Sheets

U.S. PATENT DOCUMENTS

| | | | | |
|---|---|---|---|---|
| 5,579,306 | A | * | 11/1996 | Dent .......................... 370/330 |
| 5,602,836 | A | * | 2/1997 | Papadopoulos et al. ..... 370/280 |
| 5,644,576 | A | * | 7/1997 | Bauchot et al. ............. 370/437 |
| 5,748,624 | A | * | 5/1998 | Kondo ........................ 370/347 |
| 6,411,613 | B1 | * | 6/2002 | Seymour et al. ............ 370/347 |
| 6,647,000 | B1 | * | 11/2003 | Persson et al. .............. 370/330 |
| 6,885,650 | B1 | * | 4/2005 | Schindler .................... 370/336 |
| 6,930,993 | B1 | * | 8/2005 | Hamada et al. ............. 370/347 |
| 6,956,855 | B1 | * | 10/2005 | Chang ........................ 370/394 |
| 6,958,986 | B2 | * | 10/2005 | Cain ........................... 370/337 |
| 6,965,582 | B1 | * | 11/2005 | Moulsley .................... 370/329 |
| 7,031,292 | B2 | * | 4/2006 | Laroia et al. ................ 370/347 |
| 7,092,372 | B1 | * | 8/2006 | Jensen et al. ................ 370/337 |
| 7,133,396 | B1 | * | 11/2006 | Schmidl et al. ............. 370/347 |
| 7,181,666 | B2 | | 2/2007 | Grob et al. |
| 2002/0036986 | A1 | * | 3/2002 | Haarsten .................... 370/235 |
| 2002/0097783 | A1 | * | 7/2002 | Kimata ....................... 375/147 |
| 2003/0002518 | A1 | * | 1/2003 | Shibutani ................... 370/442 |
| 2003/0165123 | A1 | * | 9/2003 | Saunders et al. ............ 370/329 |
| 2004/0057398 | A1 | * | 3/2004 | Black ......................... 370/321 |
| 2004/0203538 | A1 | * | 10/2004 | Leppanen et al. ........... 455/101 |
| 2004/0221218 | A1 | | 11/2004 | Grob et al. |
| 2004/0223473 | A1 | * | 11/2004 | Ha et al. ..................... 370/335 |
| 2005/0053092 | A1 | * | 3/2005 | Yang .......................... 370/468 |
| 2005/0195786 | A1 | * | 9/2005 | Shpak ........................ 370/338 |
| 2006/0034239 | A1 | * | 2/2006 | Abeta et al. ................. 370/341 |
| 2006/0239214 | A1 | * | 10/2006 | Zeira et al. .................. 370/280 |
| 2007/0223425 | A1 | * | 9/2007 | Masui et al. ................ 370/335 |

FOREIGN PATENT DOCUMENTS

| | | |
|---|---|---|
| JP | 64055937 | 3/1989 |
| JP | 06037763 | 2/1994 |
| JP | 2000308146 A | 11/2000 |
| KR | 20030006415 | 1/2003 |
| KR | 20040026231 | 3/2004 |
| WO | WO 01/48958 | 7/2001 |
| WO | WO2004079944 | 9/2004 |

OTHER PUBLICATIONS

Jantti et al., "Transmission rate scheduling for the non-real-time data in a cellular CDMA system," Communications Letters, IEEE, vol. 5, Issue 5, May 2001, pp. 200-202.

International Preliminary Report on Patentability—PCT/US02/033742, International Bureau of WIPO—Geneva, Switzerland, Apr. 11, 2007.

Written Opinion—PCT/US05/033742, International Search Authority-European Patent Office, Jan. 5, 2006.

International Search Report-PCT/US05/033742, International Search Authority-European Patent Office, Jan. 5, 2006.

\* cited by examiner

METHOD AND APPARATUS FOR ASSIGNING USERS TO USE INTERLACES IN A WIRELESS CELLULAR COMMUNICATION SYSTEM

BACKGROUND

1. Field

The present disclosure relates generally to data communication, and more specifically to methods and apparatuses for assigning users to use interlaces in a wireless cellular communication system.

2. Background

Wireless communication systems are widely deployed to provide various types of communication such as voice, packet data, video, etc. These systems may be based on Code Division Multiple Access (CDMA), Time Division Multiple Access (TDMA), or some other multiple access technique. CDMA systems may provide certain advantages over other types of systems, including increased system capacity. A CDMA system is typically designed to implement one or more publicly known standards, such as Interim Standard 95 (IS-95), CDMA2000, IS-856, Wideband CDMA (WCDMA), and Time Division-Synchronous CDMA (TD-SCDMA).

Signals transmitted from a user terminal to a base station may act as interference to signals transmitted from other user terminals to the base station, even if the signals are Code Division Multiple Access (CDMA) signals.

SUMMARY

Methods and apparatuses are described herein to selectively assign a plurality of user terminals to transmit data on a plurality of time slot interlaces. These methods and apparatuses may improve reverse link (RL) capacity compared to a Code Division Multiple Access (CDMA) system that allows each user terminal to transmit data in all interlaces.

In one embodiment, each user terminal may be assigned an Interlace Preference Factor (IPF) for each interlace. For example if there are three interlaces, each user terminal may be assigned three IPFs, one for each interlace. An IPF represents a probability that a user terminal will transmit data in a specific interlace. Each IPF may be set to 0, 1 or a value between 0 and 1. A base station may assign IPFs to user terminals and also modify IPFs if channel conditions change or certain time periods expire. Assigning IPF values for a plurality of user terminals to retain a probabilistic nature may improve performance.

One method comprises determining an interlace preference factor for a first interlace. The interlace preference factor represents a probability of a first terminal transmitting data in the first interlace to a second terminal. Based on the interlace preference factor for the first interlace, the method determines whether to transmit data in the first interlace from the first terminal to the second terminal.

Another method comprises assigning a first interlace preference factor for a first interlace to a first user terminal; assigning a second interlace preference factor for a second interlace to the first user terminal; and sending a message to inform the first user terminal of the assigned first and second interlace preference factors.

One apparatus comprises a transmitter and a processor. The transmitter is configured to transmit data to a remote station. The processor is configured to determine an interlace preference factor for a first interlace. The interlace preference factor represents a probability of the transmitter transmitting data in the first interlace to the remote station. Based on the interlace preference factor for the first interlace, the processor is configured to determine whether the transmitter will transmit data in the first interlace from the user terminal to the base station.

Another apparatus comprises a processor and a transmitter. The processor is configured to assign a first interlace preference factor for a first interlace to a first user terminal and assign a second interlace preference factor for a second interlace to the first user terminal. The transmitter is configured to send a message to the first user terminal indicating the assigned first and second interlace preference factors.

Various aspects, embodiments, and features are described in further detail below.

BRIEF DESCRIPTION OF THE DRAWINGS

The features, nature, and advantages of the present application may be more apparent from the detailed description set forth below with the drawings. Like reference numerals and characters may identify the same or similar objects.

DETAILED DESCRIPTION

Figure 1:
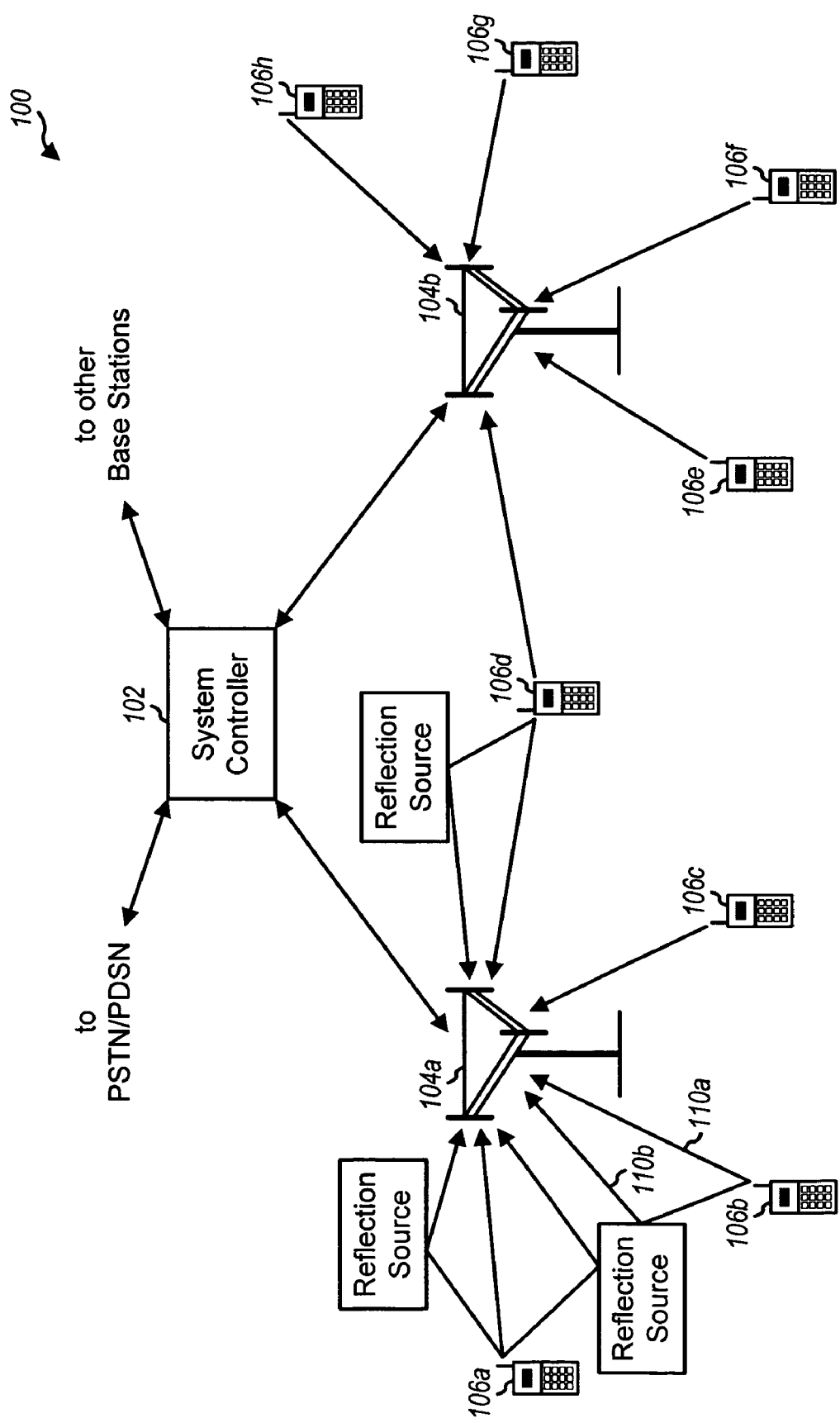
FIG. 1 illustrates a wireless communication system.

FIG. 1 illustrates a wireless communication system 100 that supports a number of user terminals 106A-106H, which may also be called access terminals, ATs, remote terminals, mobile units, mobile phones, mobile terminals, mobile devices, cell phones, etc. Various aspects and embodiments described herein may be implemented with the system 100. System 100 provides communication for a number of cells, where each cell is serviced by a corresponding base station 104. A base station may also be referred to as a base station transceiver system (BTS), an access point, or a Node B. The user terminals 106A-106H may be dispersed throughout the system 100. Each user terminal 106 may communicate with one or more base stations 104 on the forward and reverse links at any given moment, depending on whether or not the user terminal 106 is active and whether or not the user terminal 106 is in soft handoff. Forward link (FL) (i.e., downlink) refers to transmission from a base station 104 to a user terminal 106. Reverse link (RL) (i.e., uplink) refers to transmission from a user terminal 106 to a base station 104.

In system 100, a system controller 102 (also referred to as a base station controller (BSC)) may provide coordination and control for base stations 104 coupled to the system controller 102, and may further control the routing of calls to user terminals 106 via the coupled base stations 104. System controller 102 may be further coupled to a Public Switched Telephone Network (PSTN) via a Mobile Switching Center (MSC), and to a packet data network via a Packet Data Serving Node (PDSN). System 100 may be designed to support one or more CDMA standards, such as IS-95, CDMA2000, CDMA 2000 1xEV-DV, CDMA 2000 1xEV-DO (IS-856), WCDMA, TD-SCDMA, TS-CDMA, or some other CDMA standards.

Various aspects and embodiments of the present disclosure may be applied to forward and reverse links in various wireless communication systems. As an example, interlace allocation techniques are described below for a CDMA 2000 1xEV-DO reverse link.

Figure 2:
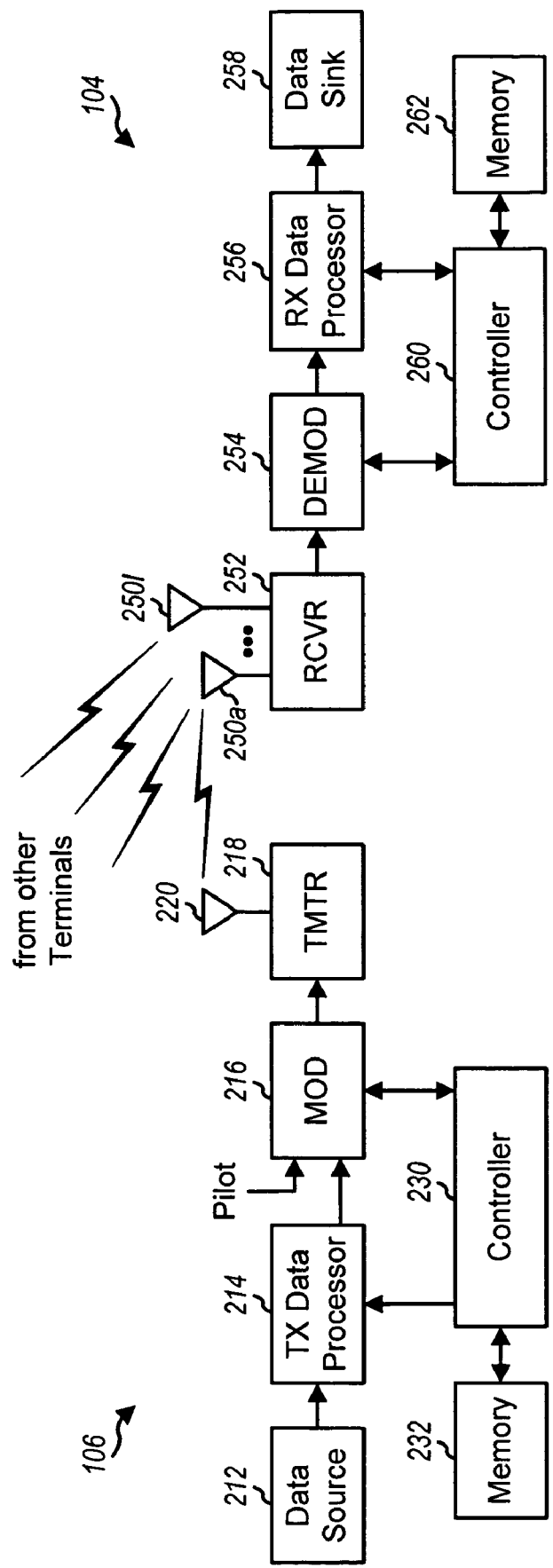
FIG. 2 illustrates an embodiment of a user terminal and a base station.

FIG. 2 is a simplified block diagram of an embodiment of a user terminal 106 and a base station 104. On a reverse link, a data source 212 at terminal 106 provides various types of user-specific data, messages, etc. to a transmit (TX) data processor 214. TX data processor 214 formats and codes the different types of data based on one or more coding schemes to provide coded data. Each coding scheme may include any combination of cyclic redundancy check (CRC), convolutional coding, Turbo coding, block coding, other types of coding, or no coding at all. Interleaving may be applied when error correcting codes are used to combat fading. Other coding schemes may include Automatic Repeat Request (ARQ), Hybrid ARQ (described below), and incremental redundancy repeat techniques. Typically, different types of data are coded with different coding schemes.

A modulator (MOD) 216 receives pilot data and the coded data from TX data processor 214 and further processes the received data to generate modulated data. The reverse link modulated signal is then transmitted via an antenna 220 over a wireless communication link to one or more base stations 104.

One or more antennas 250A-250L at base station 104 receive the reverse link modulated signals from a number of terminals 106. Multiple antennas 250A-250L may be used to provide spatial diversity against deleterious path effects such as fading. As an example, a base station may include six antennas and support three sectors with two antennas for each sector. Any number of antennas and sectors may be employed at the base station 104. Each antenna 250 may have multiple antenna elements.

Each received signal is provided to a respective receiver (RCVR) 252, which conditions (e.g., filters, amplifies, downconverts) and digitizes the received signal to generate data samples for that received signal.

A demodulator (DEMOD) 254 receives and processes the data samples for all received signals to provide recovered symbols. For CDMA2000, the processing by demodulator 254 to recover a data transmission from a particular terminal includes (1) despreading the data samples with the same spreading sequence used to spread the data at the terminal, (2) channelizing the despread samples to isolate or channelize the received data and pilot onto their respective code channels, and (3) coherently demodulating the channelized data with a recovered pilot to provide demodulated data. Demodulator 254 may implement a rake receiver to process multiple signal instances for each of a number of terminals.

A receive (RX) data processor 256 receives and decodes the demodulated data for each terminal 106 to recover the user-specific data and messages transmitted by the terminal 106 on the reverse link. The processing by demodulator 254 and RX data processor 256 is complementary to that performed by modulator 216 and TX data processor 214, respectively, at the terminal 106.

Packets and Subpackets

The bits of a data packet from the data source 212 may be repeated and processed by the processor 214 (and/or modulator 216) into a plurality of corresponding subpackets for transmitting to the base station 104. If the base station 104 receives a high signal-to-noise-ratio signal, the first subpacket may contain sufficient information for the base station 104 to decode and derive the original data packet.

For example, a data packet from the data source 212 may be repeated and processed by the processor 214 into four subpackets. The user terminal 106 sends a first subpacket to the base station 104. The base station 104 may have a relatively low probability of correctly decoding and deriving the original data packet from the first received subpacket. But as the base station 104 receives the second, third and fourth subpackets and combines information derived from each received subpacket, the probability of decoding and deriving the original data packet increases. As soon as the base station 104 correctly decodes the original packet (e.g., using a cyclic redundancy check (CRC) or other error detection techniques), the base station 104 sends an acknowledgement signal to the user terminal 106 to stop sending subpackets. The user terminal 106 can then send a first subpacket of a new packet.

Interlacing

A transmitter in a user terminal 106 (or a base station 104) in the communication system 100 may transmit packets in a time interlacing structure to a receiver in a base station 104 (or a user terminal 106).

Figure 3:
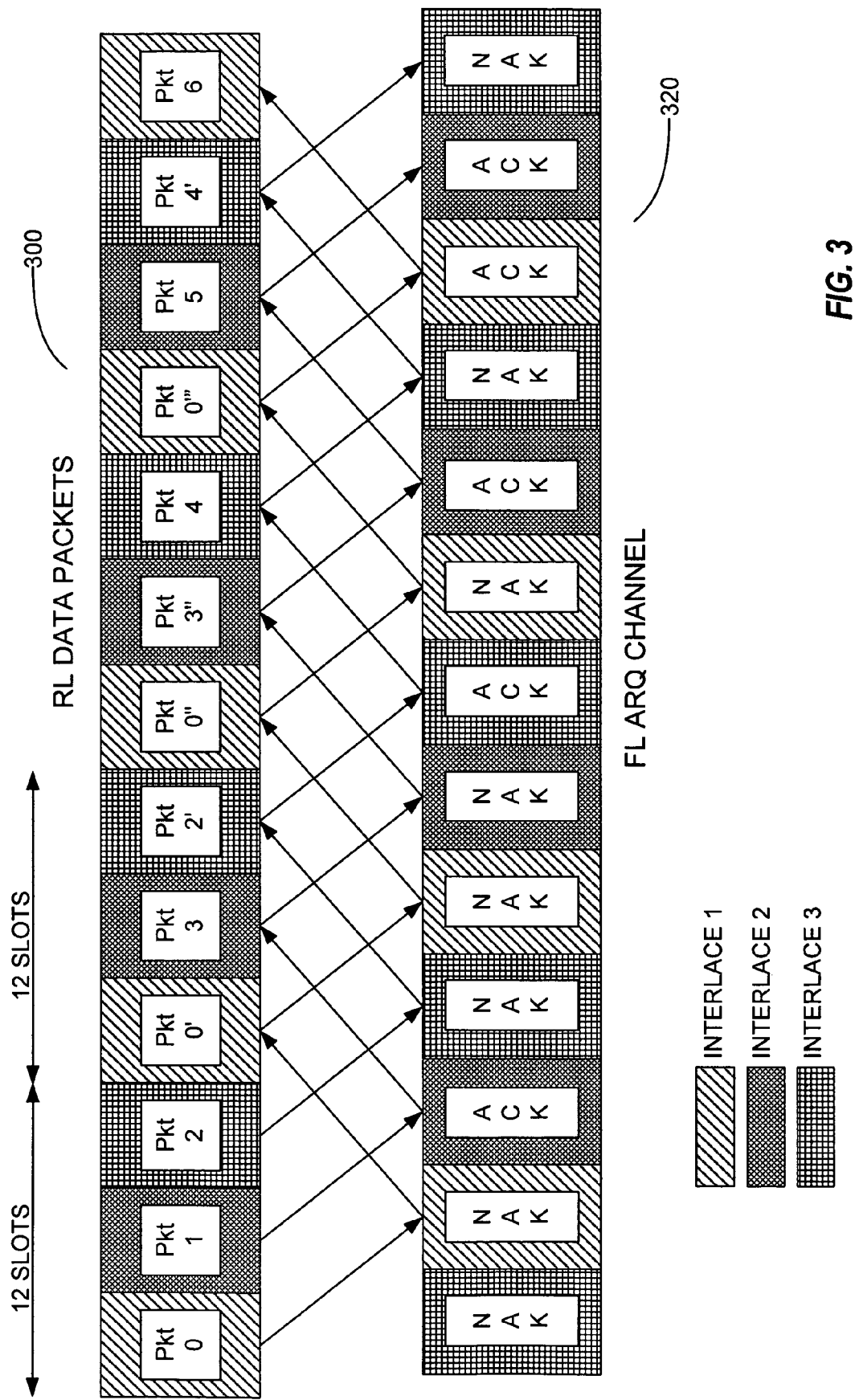
FIG. 3 illustrates an example of a reverse link interlacing structure and a corresponding forward link interlacing structure.

FIG. 3 illustrates an example of a reverse link (RL) interlacing structure 300 (e.g., for 1xEV-DO Revision A RL data channel) and a corresponding forward link (FL) interlacing structure 320 (e.g., for a 1xEV-DO FL ARQ channel). The interlacing structure 300 has three Interlaces 1, 2 and 3, but any number of interlaces may be implemented with the techniques described below. Each interlace comprises a set of time-staggered segments. In this example, each segment is four time slots long. During each segment, a user terminal 106 can transmit a subpacket to the base station 104. Since there are three interlaces and each segment is four time slots long, there are eight time slots between the end of a subpacket of a given interlace and the beginning of the next subpacket of the same interlace.

The length of time between subpackets of the same interlace (e.g., eight time slots in FIG. 3) is typically large enough to enable the base station 104 to (a) attempt to decode a packet from the received subpacket, (b) determine if a packet was decoded correctly from the received subpacket, and (c) send an acknowledgement (ACK) or no acknowledgement (NACK) message back to the user terminal 106 before the user terminal 106 transmits the next subpacket of the interlace. If the base station 104 notifies the user terminal 106 that a packet was not decoded correctly, the user terminal 106 transmits another subpacket of the same packet if the maximum number of subpackets (e.g., 4) has not yet been reached. If the packet was decoded correctly, the user terminal 106 may then transmit a first subpacket of a new packet.

For example, in FIG. 3, a user terminal 106 transmits subpacket 0 during the first segment of Interlace 1 to the base station 104. The base station 104 fails to properly decode a packet from the received subpacket 0 and sends a NACK message to the user terminal 106 before the user terminal 106 transmits the next subpacket of Interlace 1. The user terminal 106 transmits subpacket 0' during the second segment of Interlace 1 to the base station 104. The process repeats until the base station 104 properly decodes a packet from the fourth received subpacket 0''' and sends an ACK message back to the user terminal 106. The user terminal 106 then transmits a subpacket of another packet, packet 6, in Interlace 1.

This describes Hybrid Automatic Repeat Request (H-ARQ) applied to an interlaced transmission. H-ARQ may significantly improve the capacity of wireless communications systems when the channel or interference is time varying from one subpacket of a given interlace to the next subpacket of the given interlace. In Revision A of 1xEV-DO, H-ARQ and interlaces will be used in both the time division multiplexed (TDM) forward link (FL) and the code division multiplexed (CDM) reverse link (RL).

The default configuration for this 1xEV-DO CDMA RL is that each user terminal 106 with data to send will use all 3 interlaces. In the CDMA RL of systems which use H-ARQ, a typical implementation would be to allow each user terminal 106 to transmit in any number of interlaces. For example, in a system with 3 interlaces, such as the 1xEV-DO Revision A RL, user terminals 106 with data to send would typically transmit on all 3 interlaces. In that respect, the interlacing does not increase the reverse link capacity, but rather enables the use of H-ARQ. The methods described below will not limit the positive gains of ARQ.

The methods described below selectively (and probabilistically in one embodiment) allocate a plurality of user terminals to use a plurality of interlaces, which may increase CDMA reverse link capacity. In one embodiment, when the received signal-to-interference-and-noise ratio (SINR) (measured at a base station 104) of a subset of transmitting user terminals 106 is sufficiently high, the base station 104 may selectively allocate the RL user terminals 106 to use the interlaces, instead of the default configuration of allocating each user terminal 106 to all interlaces. For example, this may occur when the number of RL user terminals 106 is not significantly larger than the number of receiver base station antennas times the number of interlaces.

The base station 104 may use Minimum Mean Squared Error (MMSE) combining weights when demodulating packets to suppress inter-user interference. Finding a signal-to-interference-and-noise ratio gained by each user terminal by removing one other user terminal, i.e., suppressing interference from that user terminal, may be done since the BTS receiver will have knowledge of each transmitter's channel and can perform computations based on calculating correlation values. Suppressing inter-user interference may make the SINR-per-user-terminal high enough that selectively allocating RL user terminals 106 to use the interlaces will improve capacity.

An example of such a communication system may have 12 or less RL user terminals 106 per sector and three RL interlaces, where each sector employs four receiver antennas. Also, if certain user terminals 106 have high SINRs when transmitting alone, the base station 104 may allocate those user terminals 106 to share one interlace in a round robin fashion.

Interlace Preference Factor (IPF)

An Interlace Preference Factor (IPF) is an original term created herein to represent a probability that a user terminal 106 with data ready to transmit will transmit data during a specific interlace. Each IPF may be set to 0, 1 or a value between 0 and 1. If IPF is set to a value between 0 and 1, the user terminal will generate a random number uniformly distributed between 0 and 1 and transmit data in the interlace if the randomly generated number is less than or equal to the IPF value. For example, an IPF set to 0.5 means the user terminal 106 makes a decision whether to transmit data or not transmit data in a specific interlace, and each choice is weighted evenly at 50-50. The user terminal 106 may generate a random number of 0 or 1, where 0 means transmit data in the interlace, and 1 means do not transmit data in the interlace. In an alternative example, 0 may mean do not transmit data in the interlace, and 1 may mean transmit data in the interlace.

As another example, if IPF is set to 0.7, the user terminal 106 may generate a random number between 0 and 1. If the user terminal 106 generates 0.1, 0.2, 0.3, 0.4, 0.5, 0.6 or 0.7, the user terminal 106 transmits data in the interlace. If the user terminal 106 generates 0.8, 0.9 or 1.0, the user terminal 106 does not transmit data in the interlace.

Figure 4:
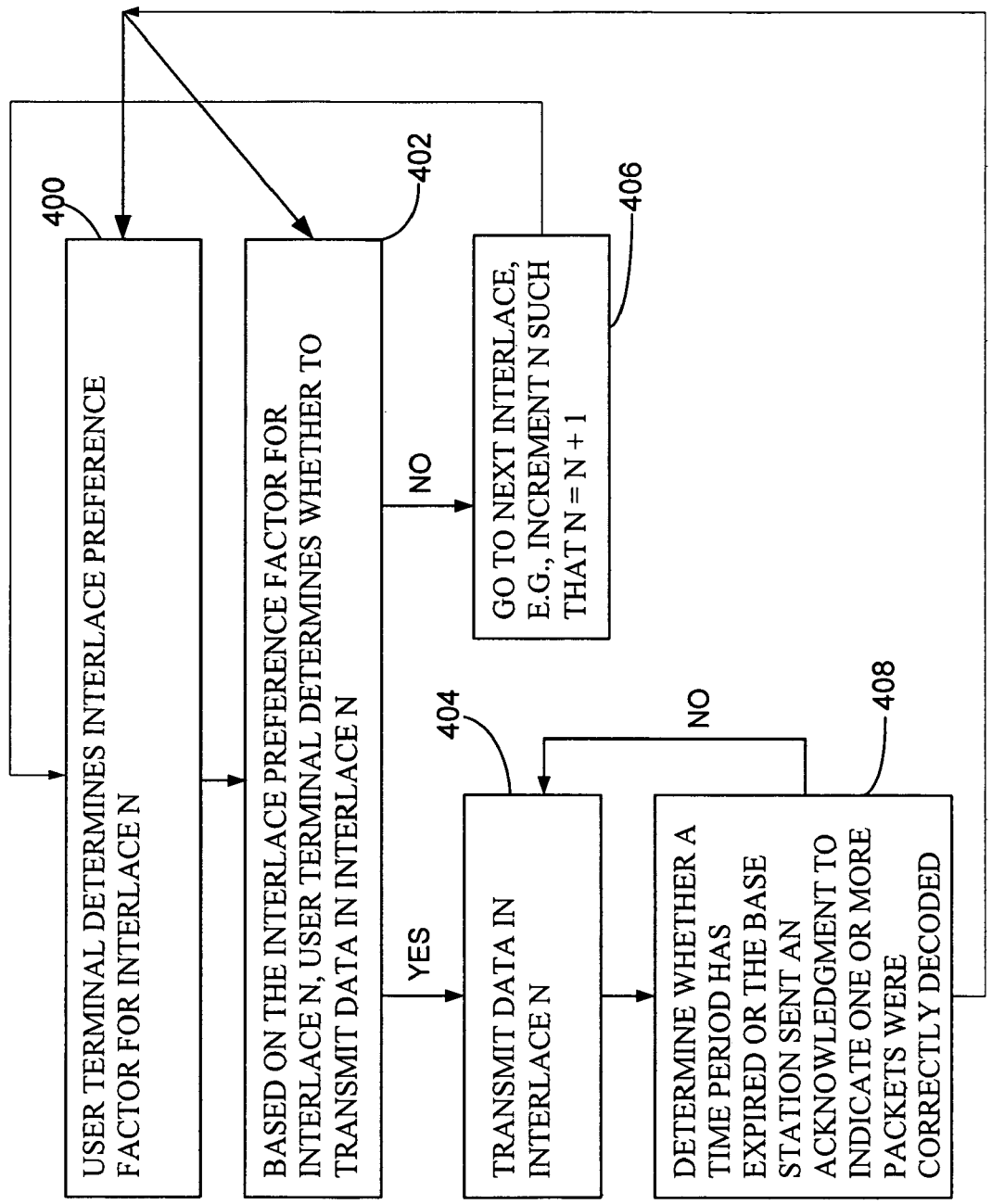
FIG. 4 illustrates a method of a user terminal using an Interlace Preference Factor (IPF).

FIG. 4 illustrates a method of a user terminal 106 using an Interlace Preference Factor (IPF). In block 400, a user terminal 106 determines an IPF for interlace N, for example, by receiving a message from a base station 104 (described below) or retrieving an IPF from a memory or register. In block 402, based on the IPF for interlace N, the user terminal 106 determines whether to transmit data in interlace N. For example, if the IPF is 0.5, the user terminal 106 may randomly generate a 0 or 1. If the determination is positive, the user terminal 106 transmits data in interlace N in block 404. If the determination is negative, the user terminal 106 determines whether to transmit data in the next interlace by incrementing N such that N=N+1, in block 406 and returning to block 400.

In block 408, the user terminal 106 determines whether a time period has expired or whether an acknowledgment has been received from the base station 104 to indicate one or more packets were correctly decoded. If not, the user terminal 106 continues to transmit data in the interlace in block 404. If a time period has expired or an acknowledgment has been received from the base station 104, the user terminal 106 may return to block 400 or block 402.

A base station 104 may assign IPFs to user terminals 106 and also modify IPFs if channel conditions change or certain time periods expire. Assigning IPF values for a plurality of user terminals 106 to retain a probabilistic nature may improve performance.

In one example, a communication system may have three interlaces and six user terminals 106 with data ready to transmit. A typical CDMA system may allow each user terminal 106 to transmit data in every interlace, which results in an IPF of 1 for each user terminal 106 in each interlace. This is shown below in Table 1.

TABLE 1

Default Interlace Preference Factors

| | Interlace 1 Preference Factor | Interlace 2 Preference Factor | Interlace 3 Preference Factor |
|---|---|---|---|
| User 1 | 1 | 1 | 1 |
| User 2 | 1 | 1 | 1 |
| User 3 | 1 | 1 | 1 |
| User 4 | 1 | 1 | 1 |
| User 5 | 1 | 1 | 1 |
| User 6 | 1 | 1 | 1 |

The sum of each row in Table 1 represents an expected number of interlaces used by a user terminal 106. Each user terminal 106 in Table 1 is expected to transmit data in all three interlaces. The sum of each column represents an expected number of user terminals 106 transmitting in a specific interlace. Each interlace in Table 1 has six expected user terminals 106 transmitting data simultaneously using CDMA. The row and column sums may be greater than 1.

It may not always be desirable to have all user terminals 106 transmitting simultaneously because they may generate noise or interference in the communication system as well as consume power. It may be better to select a subset of one or more user terminals 106 to transmit simultaneously, but also give each user terminal 106 an opportunity to transmit at some time. Certain user terminals 106 may be selected to transmit simultaneously under various circumstances, e.g., based on their received SINR at the base station 104.

Each entry in Table 1 may be selected and set by the base station 104 (or base station controller 102) to a value of 0, 1 or between 0 and 1 (described below with Table 5). The base station 104 may send messages to the user terminals 106 to notify them of the interlace allocations.

If one of the three interlaces is reserved for a single user terminal 106 to transmit data, then the IPF table at a given point in time may look like Table 2.

TABLE 2

Example of Interlace Preference Factor Allocation where a Single User Gets to Transmit Alone in an Interlace

|  | Interlace 1 Preference Factor | Interlace 2 Preference Factor | Interlace 3 Preference Factor |
|---|---|---|---|
| User 1 | 0 | 1 | 1 |
| User 2 | 0 | 1 | 1 |
| User 3 | 0 | 1 | 1 |
| User 4 | 1 | 1 | 1 |
| User 5 | 0 | 1 | 1 |
| User 6 | 0 | 1 | 1 |

If the SINR measured at the base station 104 for User 4 transmitting data alone is relatively high, the allocation of Interlace 1 to only User 4, as shown in Table 2, would likely increase the RL capacity.

If more than one user terminal 106 has a relatively high SINR when transmitting data alone, the base station 104 may allocate an interlace, e.g., Interlace 1, to these high-SINR user terminals 106 round-robin, one at a time, in a scheduled mode. These high-SINR user terminals represent a subset of the total set of user terminals with data to send. Thus, at a subsequent point in time, the IPF table would be identical to Table 2 except the "1" in the Interlace 1 Preference Factor column would move from User 4 to another high-SINR user. Although Table 2 shows that the user allowed to transmit in Interlace 1 is also allowed to transmit in the other interlaces, this is not a requirement.

Example of 1xEV-DO Revision A Operation for IPF with One Interlace Reserved for a Single User Terminal to Transmit The goal in this example is for user terminals 106 with relatively high SINR when they transmit alone to share Interlace 1 and for all users to transmit in Interlaces 2 and 3, as shown in Table 2. Alternatively, in another embodiment, it is also possible to have high-SINR users transmit alone in two of the three interlaces. In a 1xEV-DO system, there may be several ways for a BTS to predict which RL users will have a high SINR when transmitting alone, such as (a) using FLsinr (variable for forward link signal-to-interference plus noise ratio) or a Data Rate Control (DRC) value with ActiveSetSize (size of an active set, which is a list of pilot signals from different base stations being used for a current connection), or (b) round robin or pick the user terminal 106 with the best short-term (filtered) FLsinr.

For a 1xEV-DO system configured to allow only a single user to transmit in Interlace 1 while all users transmit in Interlaces 2 and 3, the IPF Medium Access Control (MAC) operation mechanisms may include the following.

On a Control Channel, the base station 104 may (a) notify all user terminals 106 in one sector of an IPF mode (using IPFs); (b) specify which interlace is used for the single user terminal 106 to transmit (e.g., Interlace 1 in this example); and (c) synchronize all user terminals 106 on a subframe boundary.

On a Grant Channel, the base station 104 may (a) assign one user terminal 106 to Interlace 1; (b) send a grant message, which includes traffic-to-pilot (T2P) (applied only to Interlace 1) and T2P_hold signals; and (c) update the grant message periodically to allow good-channel user terminals 106 to share Interlace 1. The Interlace Assignment Attribute may be updated through Generic Attribute Update Protocol (GAUP).

All user terminals 106 transmitting in Interlaces 2 and 3 may run the typical 1xEV-DO Revision A CDMA MAC when in Interlace 1. Specifically, the β factor (which is defined in the 1xEV-DO Rev A standard as the ratio between β and the traffic-to-pilot (T2P) of current packet transmission) of non-transmit user terminals 106 may be set to zero during Interlace 1. At the user terminal 106, Quick Reverse Activity Bit (QRAB) and Filtered Reverse Activity Bit (FRAB) (from BestFLSector), Bucket level and T2P level may be frozen. At the base station (BTS) 104, a Rise Over Thermal (ROT) filter and busy bit-decision may be frozen.

Interference Suppression

If the base station 104 is able to suppress RL interference, e.g., a base station with an antenna array that enables Minimum Mean Squared Error (MMSE) and combining weights when demodulating packets to suppress inter-user interference, then the base station 104 may simultaneously allocate multiple (but not necessarily all) user terminals 106 in each interlace. Table 3 shows an example with two user terminals 106 allocated to each interlace.

TABLE 3

Example of Allocating 2 RL Users per Interlace

|  | Interlace 1 Preference Factor | Interlace 2 Preference Factor | Interlace 3 Preference Factor |
|---|---|---|---|
| User 1 | 0 | 1 | 0 |
| User 2 | 1 | 0 | 0 |
| User 3 | 0 | 0 | 1 |
| User 4 | 0 | 1 | 0 |
| User 5 | 1 | 0 | 0 |
| User 6 | 0 | 0 | 1 |

An MMSE receiver may effectively minimize interference between user terminals 106 when the user terminals 106 are separated in an azimuth angle relative to the base station 104 (e.g., see FIG. 6) and there is little multipath propagation. An example of such a system is a network of ground base stations communicating with airplanes flying in the sky.

Allocating User Terminals to an Interlace Based on SINR Prediction

A general method of selecting and allocating user terminals 106 to a plurality of interlaces is described below first, followed by a specific example with three interlaces and six user terminals 106.

Figure 5:
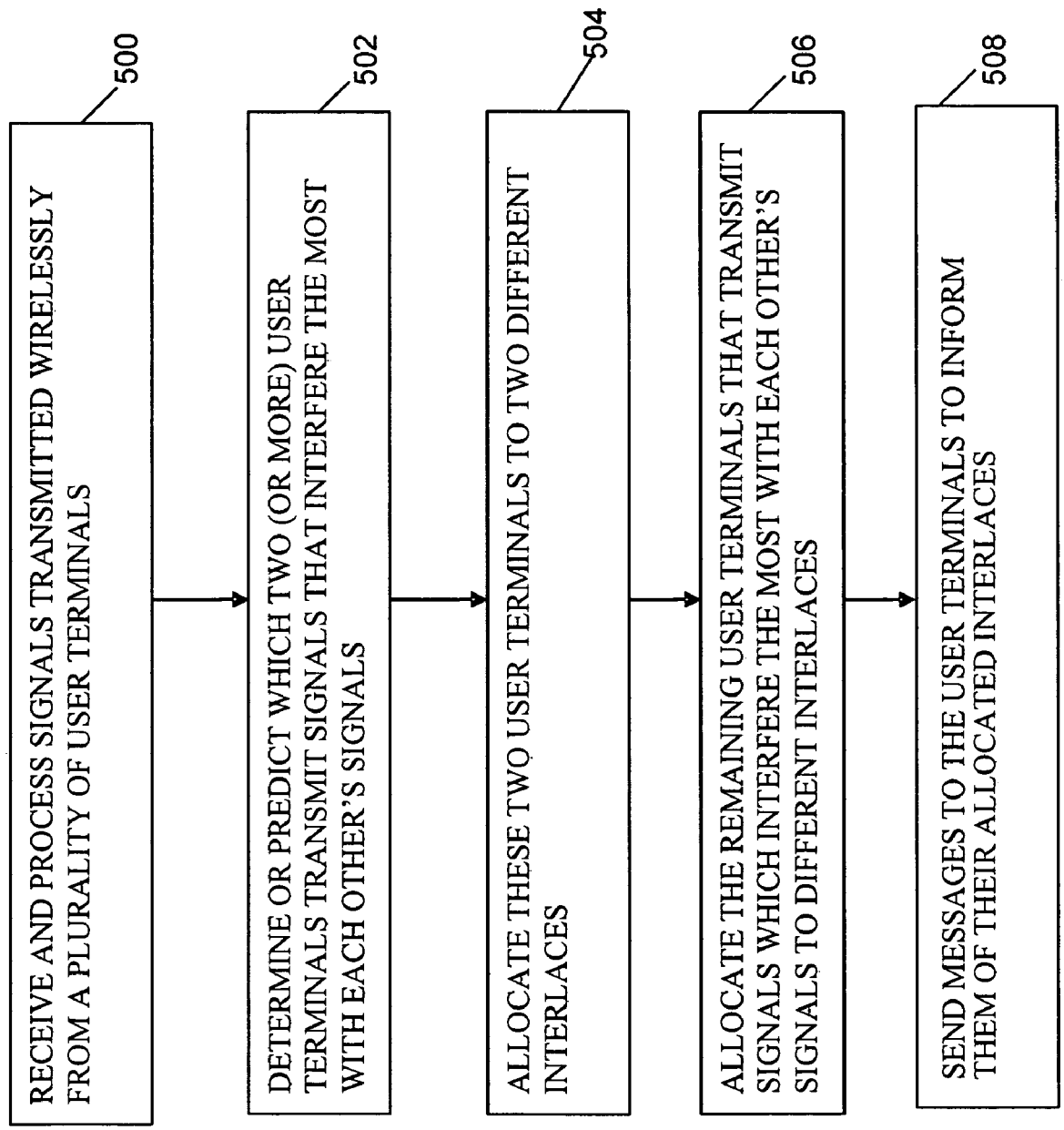
FIG. 5 illustrates a method of selecting and assigning user terminals to a plurality of interlaces.

FIG. 5 illustrates a method of selecting and allocating user terminals 106 to a plurality of interlaces. In block 500, the base station 104 receives and processes signals transmitted wirelessly from a plurality of user terminals 106.

In block 502, the base station 104 determines (or predicts) which two (or more) user terminals 106 transmitted (or will transmit) signals interfere the most with each other's signals. There may be more than one way to determine these user terminals 106. In one process, the base station 104 determines the SINR of a first user terminal 106 transmitting in a cell (or a sector of the cell), without the transmissions of one other user terminal 106 in the cell (or sector), one at a time, to find a user terminal(s) 106 whose removal from the cell maximizes the SINR of the first user terminal 106. The base station 104 repeats this process to find two user terminals that interfere the most with each other.

In the equations below, SINR(i) denotes the SINR of user terminal i when all user terminals are present in the cell (or a corresponding interlace). $SINR^{(j)}(i)$ denotes the SINR of user terminal i with transmissions from user terminal j removed or ignored. The base station 104 determines which two user terminals interfere the most with one another in block 502 and allocates these two user terminals to two different interlaces (e.g., Interlaces 1 and 2) in block 504. $I_k$ denotes the users allocated to interlace k. Then the users allocated to Interlaces 1 and 2 may be expressed as:

$$[I_1, I_2] = \underset{[i,j]}{\mathrm{argmax}}\ SINR^{(j)}(i)/SINR(i)$$

After the base station 104 determines the first two user terminals to allocate to interlaces 1 and 2, the base station 104 allocates the remaining user terminals that transmit signals which interfere the most with each other's signals to different interlaces in block 506. For example, the base station 104 determines which user terminal has the highest gain in SINR by being allocated to Interlace 3. The base station 104 allocates this third user terminal to Interlace 3.

$$[temp\_I_{31}, temp\_I_{32}] = \underset{[i,j]}{\mathrm{argmax}}\ SINR^{(I_1 \cup I_2 \cup j)}(i)/SINR(i)$$

$$I_3 = \underset{j \in temp\_I_{\{31,32\}}}{\mathrm{argmax}}\ (SINR^{(j)}(I_1)/SINR(I_2) + SINR^{(j)}(I_2)/SINR(I_2))$$

Instead of choosing the user terminal which least affects the sum SINR (normalized), the base station may alternatively choose the user terminal which affects the min-SINR.

$$I_3 = \underset{j \in temp\_I_{\{31,32\}}}{\mathrm{argmax}}\ \min(SINR^{(j)}(I_1)/SINR(I_1), SINR^{j}(I_2)/SINR(I_2))$$

Each user terminal is now successively allocated to use the interlace in which the terminal causes the least interference.

$$gain\_I_1(i) = SINR^{(I_2 \cup I_3)}(i)/SINR(i)$$

$$gain\_I_2(i) = SINR^{(I_1 \cup I_3)}(i)/SINR(i)$$

$$gain\_I_3(i) = SINR^{(I_1 \cup I_2)}(i)/SINR(i)$$

$$user\_added = \underset{i}{\mathrm{argmax}}[gain\_I_1(i), gain\_I_2(i), gain\_I_3(i)]$$

$$temp\_I = \underset{j}{\mathrm{argmax}}\ gain\_I_j(user\_added)$$

$$I_{temp\_I} = I_{temp\_I} \cup user\_added$$

If two users (or interlaces) have the same gain in SINR from the addition/removal of a new user, the base station 104 makes a random selection, e.g., by tossing an unbiased coin. This method may increase the overall achieved SINR for a given maximum transmit power, which may depend on selection of the user terminals allocated first to each interlace.

In block 508, the base station 104 sends messages to the user terminals to inform them of their allocated interlaces.

Figure 6:
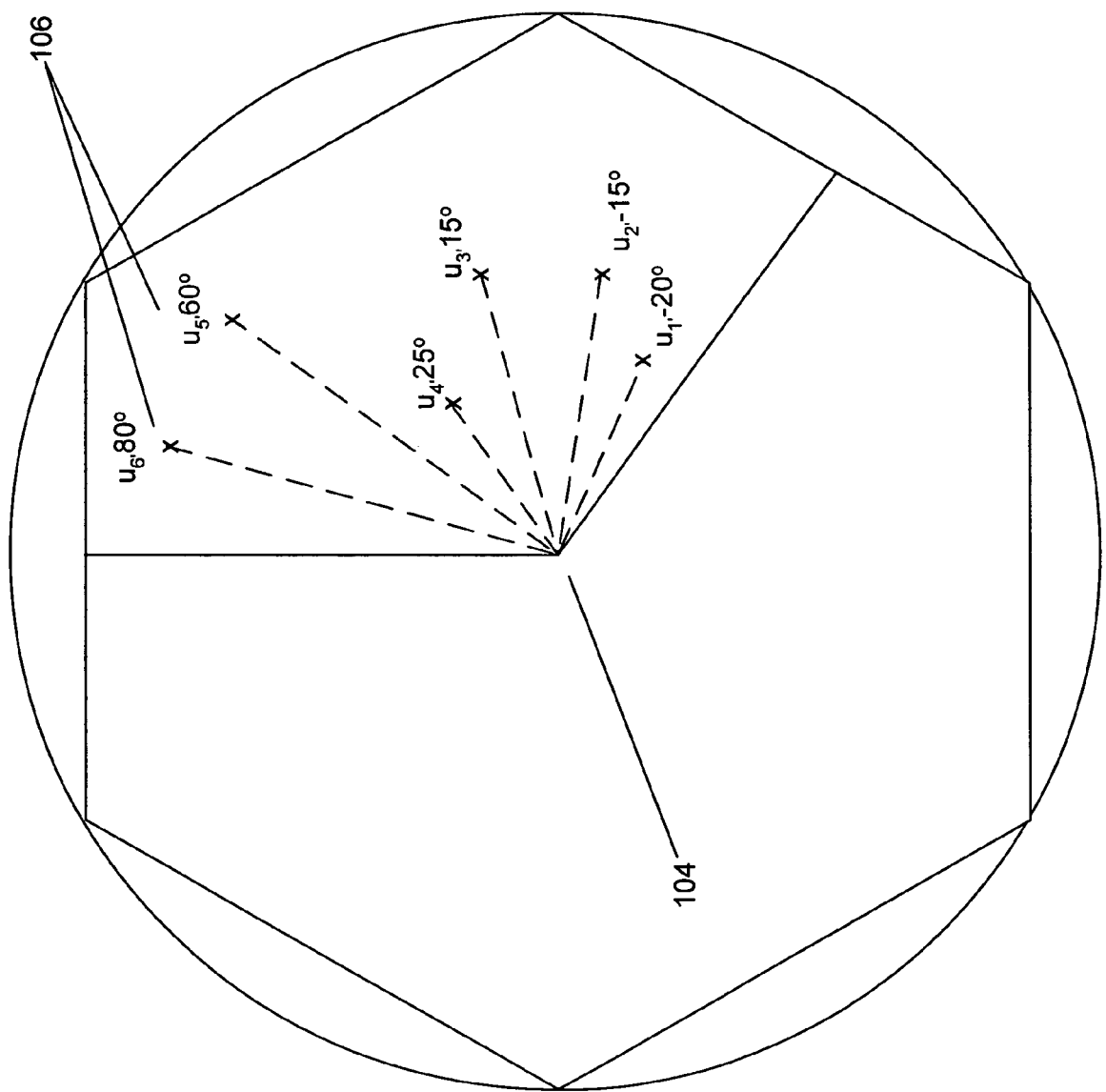
FIG. 6 illustrates six user terminals $u_1$ through $u_5$ spatially located in a sector of a cell for a base station.

A specific example of selecting and allocating user terminals 106 to use a plurality of interlaces is now described with six user terminals $u_1$ through $u_5$ spatially located in a sector of a cell for a base station, as shown in FIG. 6. The numbers next to each user terminal 106 in FIG. 6 denotes an azimuth angle from an imaginary horizontal line drawn through the base station 104. Table 4 illustrates this interlace allocation example. The three middle columns labeled $I_1$, $I_2$ and $I_3$ represent users assigned to Interlaces 1, 2 and 3.

TABLE 4

Example of an Interlace Allocation Method with Six User Terminals

| General Action | $I_1$ | $I_2$ | $I_3$ | Details and Results |
|---|---|---|---|---|
| Find users that interfere the most with each other. | — | — | — | Find SINR gained for each user by removing one other user from the system. For example, for $u_1$, find the SINR in a system with users {{1, 3, 4, 5, 6} (user 2 removed), {1, 2, 4, 5, 6} (user 3 removed), {1, 2, 3, 5, 6} (user 4 removed), {1, 2, 3, 4, 6} (user 5 removed), and {1, 2, 3, 4, 5}} (user 6 removed). For example, assume $u_1$ and $u_2$ interfere the most with each other. |
| Allocate these users to different interlaces. | $u_1$ | $u_2$ | — | $u_1$ is allocated to Interlace 1, and $u_2$ is allocated to Interlace 2. |
| Among the remaining users, find users that interfere the most with each other. | $u_1$ | $u_2$ | — | Among users $u_3, u_4, u_5$ and $u_6$, assume {$u_3, u_4$} interfere the most with each other. |
| Allocate the worst of the | $u_1$ | $u_2$ | $u_3$ | Assume $u_3$ interferes more with |

TABLE 4-continued

Example of an Interlace Allocation Method with Six User Terminals

| General Action | $I_1$ | $I_2$ | $I_3$ | Details and Results |
|---|---|---|---|---|
| two users to a different interlace. | | | | the users in Interlaces 1 and 2 $\{I_1, I_2\}$ than $u_4$. |
| Allocate the remaining users to the interlace they interfere with the least. | $u_1, u_4$ | $u_2$ | $u_3$ | Assume $u_4$ interferes more with $I_2$ than $I_1$. |
| | $u_1, u_4$ | $u_2, u_5$ | $u_3$ | Assume $u_5$ least affects $I_2$. |
| | $u_1, u_4$ | $u_2, u_5$ | $u_3, u_6$ | Assume $u_6$ least affects $I_3$. |

All user terminals 106 may need to periodically transmit in one interlace for a short period of time to perform interlace assignment based on SINR prediction.

Figure 7:
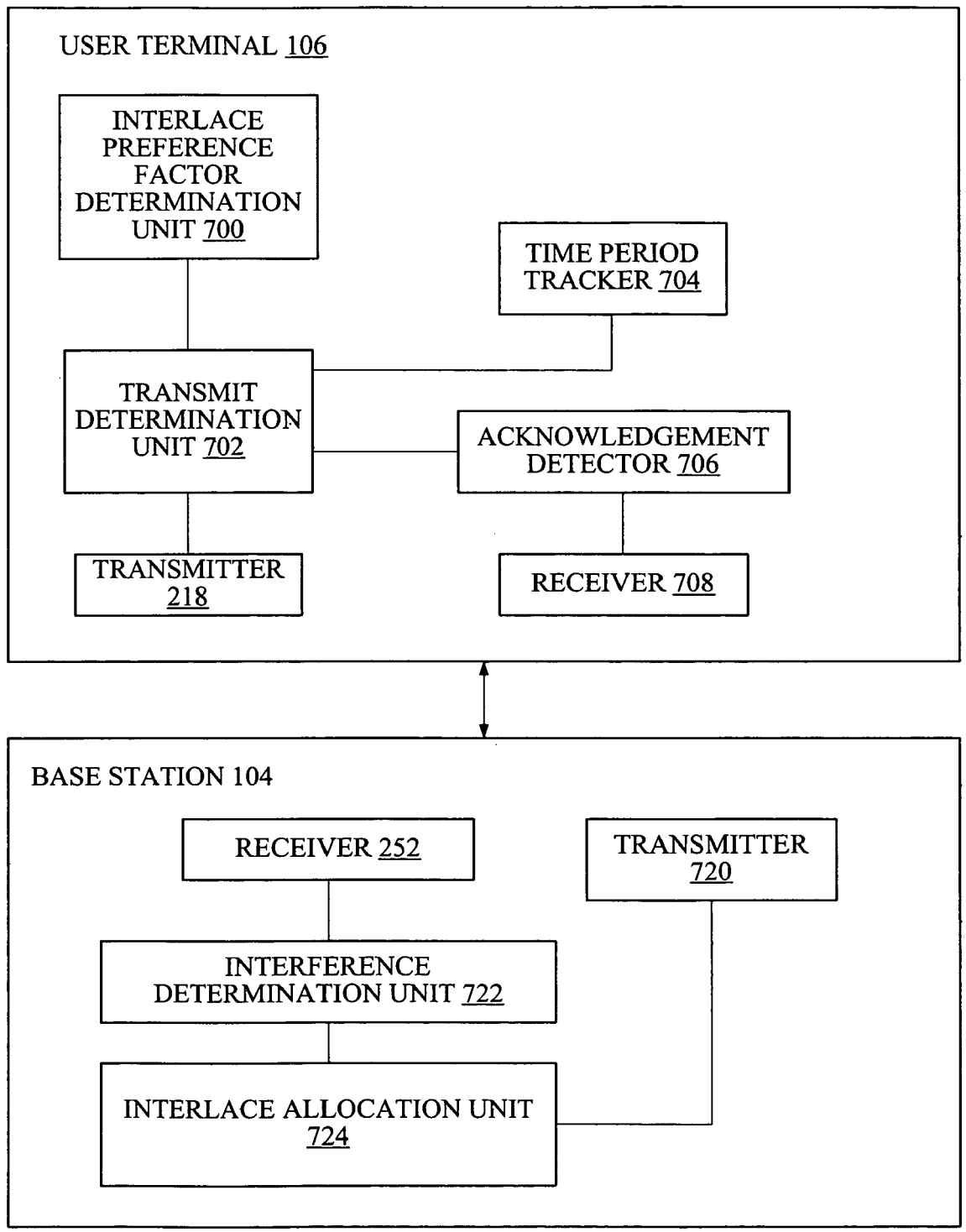
FIG. 7 illustrates some components within the user terminal and the base station of FIGS. 1 and 2 which may implement the methods of FIGS. 4 and 5.

FIG. 7 illustrates some components within the user terminal and the base station of FIGS. 1 and 2 which may implement the methods of FIGS. 4 and 5. These components may be implemented by software, hardware or a combination of hardware and software, as described below. For the user terminal 106, an interlace preference factor determination unit 700 in FIG. 7 may implement the functions described above in blocks 400 and 406 in FIG. 4. A transmit determination unit 702 may implement the functions described above in block 402 in FIG. 4. The transmitter 218 may implement the functions described above in block 404 in FIG. 4. A time period tracker 704, an acknowledgement detector 706 and a receiver 708 may implement the functions described above in block 408 in FIG. 4.

For the base station 104, the receiver 252 in FIG. 7 may implement the functions described above in block 500 in FIG. 5. An interference determination unit 722 may implement the functions described above in block 502 in FIG. 5. An interlace allocation unit 724 may implement the functions described above in blocks 504 and 506 in FIG. 5. A transmitter 720 may implement the functions described above in block 508 in FIG. 5.

IPF Values Between 0 and 1

As stated above, IPF values represent a probability (e.g., assigned by the base station 104) of a user terminal 106 transmitting in a given RL interlace. Most of the examples above use IPF values of 0 and 1, which correspond to user terminals 106 either transmitting or not transmitting in a given interlace. In other embodiments, it is possible to assign IPF values between 0 and 1. For example, an IPF value of 0.5 indicates a user terminal 106 will randomly make a decision whether to transmit or not to transmit data in a specific interlace, where each choice is weighted evenly at 50-50 (i.e., user terminal flips a coin to decide whether to transmit in that interlace).

Table 5 shows an example of the base station 104 allocating IPF values between 0 and 1 to the user terminals 106. The sum of each row represents an expected number of interlaces used by a user terminal 106, while the sum of each column represents an expected number of users using a given interlace. There is no need for the rows to sum to 1 because a user terminal 106 can transmit packets in more than one interlace. It may be efficient to balance the load of the three interlaces, i.e., try to use all interlaces evenly, by assigning IPFs such that the sums of the columns in Table 5 are approximately equal.

TABLE 5

Example of IPF Values Between 0 and 1

| | Interlace 1 Preference Factor | Interlace 2 Preference Factor | Interlace 3 Preference Factor |
|---|---|---|---|
| User 1 | 0.5 | 0.5 | 1 |
| User 2 | 0.5 | 0.5 | 1 |
| User 3 | 0.2 | 0.7 | 0.1 |
| User 4 | 0.7 | 0.1 | 0.2 |
| User 5 | 0.1 | 0.2 | 0.7 |
| User 6 | 0.3 | 0.3 | 0.3 |
| User 7 | 0.1 | 0.2 | 0.7 |

If the base station 104 did not have good knowledge of the individual user channels, allocating IPF values to retain a probabilistic nature may improve performance. This is in contrast to the deterministic behavior of the user terminals 106 when the IPF values are either 0 or 1.

There may be several ways to determine or select IPFs for user terminals 106. As described above, one method includes determining SINRs of user terminals 106. Another method may involve the base station 104 assigning IPFs according to detected data rates of the reverse link transmissions, and possibly the type of data transmission, e.g., voice, data, video, etc. The type of data transmission may be inferred by a detected data rate.

Various actions and parameters of the method described above may be changed without departing from the scope of this disclosure. For example, the method may be implemented with any number of interlaces, any number of user terminals 106, any number of base stations 104, one or more sectors or cells, any type of channel, such as a control channel, a traffic channel, etc., and any type of user terminal 106, e.g., a mobile device, a stationary device, a CDMA-only device, a dual mode device adapted for CDMA and another type of multiple access technology, such as GSM, etc.

The methods described above may be used in various wireless communication systems. For example, these techniques may be used for various CDMA systems (e.g., IS-95, CDMA2000, CDMA 2000 1xEV-DV, CDMA 2000 1xEV-DO, WCDMA, TD-SCDMA, TS-CDMA, etc.), Personal Communication Services (PCS) systems (e.g., ANSI J-STD-008), and other wireless communication systems.

The methods described above may be performed by one or more software or hardware components in the user terminal 106, base station 104 and/or system controller 102 (FIG. 1). Such components may include a processor, a memory, software, firmware or some combination thereof. For a hardware design, the methods may be implemented within one or more application specific integrated circuits (ASIC), digital signal processors (DSPs), digital signal processing devices (DSPDs), field programmable gate arrays (FPGAs), processors, microprocessors, controllers, microcontrollers, programmable logic devices (PLD), other electronic units, or any combination thereof.

For a software implementation, the methods may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as it known in the art.

Various modifications to these embodiments will be readily apparent to those skilled in the art, and the generic principles defined herein may be applied to other embodiments without departing from the spirit or scope of the disclosure. For example, although some of the aspects and embodiments described above were applied to a reverse link, various aspects and embodiments may be applied to a forward link. Thus, the present disclosure is not intended to be limited to the embodiments shown herein, but is to be accorded the widest scope consistent with the principles and features disclosed herein.

What is claimed is:

1. A method comprising:
    determining an interlace preference factor for a first interlace among multiple interlaces, each including time-staggered segments, the interlace preference factor representing a probability of a first terminal transmitting data in the first interlace to a second terminal; and
    based on the interlace preference factor for the first interlace, determining whether to transmit data in the first interlace from the first terminal to the second terminal.

2. The method of claim 1, wherein the first terminal is a user terminal, and the N second terminal is a base station.

3. The method of claim 1, wherein the interlace preference factor comprises a numerical value between 0 and 1 including 0 and 1.

4. The method of claim 1, further comprising:
    determining an interlace preference factor for a second interlace among the multiple interlaces; and
    based on the interlace preference factor for the second interlace, determining whether to transmit data in the second interlace from the first terminal to the second terminal.

5. The method of claim 1, wherein determining the interlace preference factor for the first interlace comprises receiving a message from the second terminal.

6. The method of claim 1, wherein determining the interlace preference factor for the first interlace comprises retrieving a value stored in a memory.

7. The method of claim 1, wherein determining whether to transmit data in the first interlace comprises randomly generating a number.

8. The method of claim 1, further comprising: determining whether a time period has expired;
    if the time period has not expired, continuing to transmit data in the first interlace; and
    if said time period expires, determining whether to transmit data in the first interlace from the first terminal to the second terminal.

9. The method of claim 8, further comprising determining another interlace preference factor for the first interlace.

10. The method of claim 1, further comprising: determining whether the second terminal sent an acknowledgment to indicate one or more packets were correctly decoded;
    if the second terminal has not sent an acknowledgment, continuing to transmit data in the first interlace; and
    if the second terminal sent an acknowledgment, determining whether to transmit data in the first interlace from the first terminal to the second terminal.

11. The method of claim 10, further comprising determining another interlace preference factor for the first interlace.

12. The method of claim 1, wherein transmitting data in the first interlace uses a Code Division Multiple Access channel.

13. The method of claim 1, wherein the multiple interlaces are each of the same type.

14. The method of claim 1, wherein the interlace preference factor for the first interlace is specific to the first terminal.

15. The method of claim 1, wherein determining whether to transmit data in the first interlace comprises determining whether to transmit data using each of the first interlace's time-staggered segments.

16. The method of claim 1, wherein the interlace preference factor represents a probability of a first terminal transmitting data in the first interlace as opposed to other interlaces.

17. A method comprising:
    assigning a first interlace preference factor for a first interlace to a first Code Division Multiple Access capable user terminal;
    assigning a second interlace preference factor for a second interlace to the first Code Division Multiple Access capable user terminal; and
    sending a message to inform the first Code Division Multiple Access capable user terminal of the assigned first and second interlace preference factors.

18. The method of claim 17, wherein the first and second interlace preference factors each comprise a numerical value between 0 and 1.

19. The method of claim 17, further comprising receiving data in the first and second interlaces via a Code Division Multiple Access channel from at least two user terminals including the first Code Division Multiple Access capable user terminal.

20. The method of claim 17, further comprising assigning a plurality of interlace preference factors for a system with K user terminals and M interlaces such that about K/M user terminals are assigned to each interlace.

21. The method of claim 17, further comprising assigning an interlace preference factor of zero for the first interlace to at least a second user terminal such that the first Code Division Multiple Access capable user terminal is the only user terminal allowed to transmit data in the first interlace.

22. The method of claim 21, further comprising changing the interlace preference factors such that the second Code Division Multiple Access capable user terminal is the only user terminal allowed to transmit data in the first interlace.

23. The method of claim 18, further comprising performing Hybrid Automatic Repeat Request (H-ARQ) with the received signals.

24. The method of claim 17, further comprising:
    changing the first interlace preference factor for the first interlace of the first Code Division Multiple Access capable user terminal; and
    sending a message to inform the first Code Division Multiple Access capable user terminal of the changed first interlace preference factor.

25. The method of claim 17, further comprising:
    receiving signals transmitted wirelessly from a plurality of user terminals;

determining signal-to-interference-and-noise ratios for the plurality of user terminals; and assigning interference preference factors based on said determined signal-to-interference-and-noise ratios to the plurality of user terminals.

26. The method of claim 25, wherein at least some of the received signals comprise Code Division Multiple Access signals.

27. The method of claim 25, wherein receiving signals transmitted wirelessly comprises receiving wireless signals on a common Code Division Multiple Access channel.

28. The method of claim 25, wherein the signals comprise packets of data.

29. The method of claim 17, further comprising:
determining which user terminals among a plurality of user terminals transmit signals that interfere most with each other;
assigning interlace preference factors to the user terminals that transmit signals which interfere most with each other to use different interlaces for transmitting subsequent signals; and
sending messages to the user terminals to inform them of their assigned interlaces.

30. A method comprising:
assigning a first interlace preference factor for a first interlace to a first user terminal:
assigning a second interlace preference factor for a second interlace to the first user terminal;
sending a message to inform the first user terminal of the assigned first and second interlace preference factors;
determining which user terminals among a plurality of user terminals transmit signals that interfere most with each other;
assigning interlace preference factors to the user terminals that transmit signals which interfere most with each other to use different interlaces for transmitting subsequent signals;
sending messages to the user terminals to inform them of their assigned interlaces;
among the L user terminals, determining M user terminals that transmit signals which interfere most with each other's signals, M being an integer of at least two;
assigning interlace preference factors to the M user terminals to use M different interlaces for transmitting subsequent signals;
assigning interlace preference factors to one or more remaining non-assigned L user terminals to use interlaces which the one or more remaining non-assigned L user terminals interfere with the least; and
sending messages to the user terminals to inform them of their assigned interlaces.

31. The method of claim 30, wherein L−M=N, if N is an integer of at least two, the method further comprises determining P user terminals among N non-assigned user terminals that transmit signals which interfere most with each other;
determining which one of the P user terminals transmits signals which interfere most with the M interlaces; and
assigning an interlace preference factor to the one of the P user terminals that transmits signals which interfere most with the M interlaces to use an interlace different from the M interlaces.

32. The method of claim 30; wherein determining M user terminals that interfere most with each other's signals comprises:
finding a signal-to-interference-and-noise ratio gained by each user terminal by removing one other user terminal by suppressing interference from that user terminal; and
comparing the signal-to-interference-and-noise ratios.

33. The method of claim 30, the messages notify each user terminal to transmit signals on a Code Division Multiple Access channel only in designated time slots of one or more interlaces assigned to the user terminal.

34. The method of claim 30, further comprising synchronizing transmission of Code Division Multiple Access signals by the user terminals.

35. A method comprising:
assigning a first interlace preference factor for a first interlace to a first user terminal;
assigning a second interlace preference factor for a second interlace' to the first user terminal;
sending a message to inform the first user terminal of the assigned first and second interlace preference factors;
determining which user terminals among a plurality of user terminals transmit signals that interfere most with each other;
assigning interlace preference factors to the user terminals that transmit signals which interfere most with each other to use different interlaces for transmitting subsequent signals;
sending messages to the user terminals to inform them of their assigned interlaces; and
repeating said determining and assigning for each sector of a multi-sector base station.

36. A method comprising:
assigning a first interlace preference-factor for a first interlace to a first user terminal;
assigning a second interlace preference factor for a second interlace to the first user terminal;
sending a message to inform the first user terminal of the assigned first and second interlace preference factors;
determining which user terminals among a plurality of user terminals transmit signals that interfere most with each other;
assigning interlace preference factors to the user terminals that transmit signals which interfere most with each other to use different-interlaces for transmitting subsequent signals; and
sending messages to the user terminals to inform them of their assigned interlaces, wherein each interlace comprises a sequence of time slots, the time slots of each interlace being staggered with time slots of other interlaces.

37. The method of claim 36, wherein each interlace comprises groups of staggered time slots, each group comprising a defined integer number of time slots, the integer number being at least two.

38. An apparatus comprising:
a transmitter to transmit data to a remote station; and
a processor to determine an interlace preference factor for a first time staggered interlace, the interlace preference factor representing a probability of the transmitter transmitting data in the first time interlace to the remote station, based on the interlace preference factor for the first time staggered interlace, the processor is configured to determine whether the transmitter will transmit data, in the first time staggered interlace from the user terminal to the base station.

39. The apparatus of claim 38, wherein the interlace preference factor comprises a numerical value between 0 and 1.

40. The apparatus of claim 38, further comprising a memory to store the interlace preference factor.

41. The apparatus of claim 38, wherein the transmitter is configured to transmit data in the first time staggered interlace using a Code Division Multiple Access channel.

42. The apparatus of claim 38, further comprising a Minimum Mean Square Error antenna array to receive the signals transmitted wirelessly from the plurality of user terminals.

43. The apparatus of claim 38, wherein the channel estimator finds a signal-to-interference-and-noise ratio gained by each user terminal by removing one other user terminal, and the processor compares the signal-to-interference-and-noise ratios.

44. The apparatus of claim 38, further comprising a demodulator to demodulate received Code Division Multiple Access signals.

45. An apparatus comprising:
a processor to assign a first interlace preference factor for a first interlace to a first user terminal and assign a second interlace preference factor for a second interlace to the first user terminal; and
a transmitter to send a message to the first user terminal indicating the assigned first and second interlace preference factors wherein the first interlace preference factor represents a probability of the first user terminal transmitting data in the first interlace and the second interlace preference factor represents a probability of the first user terminal transmitting data in the second interlace.

46. The apparatus of claim 45, wherein the first and second interlace preference factors each comprise a numerical value between 0 and 1.

47. The apparatus of claim 45, further comprising a receiver to receive data in the first and second interlaces via a Code Division Multiple Access channel from at least two user terminals including the first user terminal.

48. The apparatus of claim 45, further comprising:
a receiver to process signals transmitted wirelessly from a plurality of user terminals;
a channel estimator to estimate signal-to-interference-and-noise ratios of the received signals, wherein the processor is configured to assign interference preference factors based on said determined signal-to-interference-and-noise ratios to the plurality of user terminals.

49. The apparatus of claim 48, wherein the processor is configured to (a) determine which user terminals transmitted signals that interfere most with each other, and (b) assign interlace preference factors to the user terminals that transmitted signals which interfere most with each other to use different interlaces for transmitting subsequent signals.

50. An apparatus comprising a processor to (a) determine which user terminals transmitted signals that interfere most with each other's signals, and (b) assign the user terminals that transmitted signals which interfere most with each other's signals to use different interlaces for transmitting subsequent signals, wherein (b) comprises assigning interlace preference factors to each of the user terminals.

51. An apparatus comprising:
means for assigning a first interlace preference factor for a first interlace to a first user terminal:
means for assigning a second interlace preference factor for a second interlace to the first user terminal;
means for sending a message to inform the first user terminal of the assigned first and second interlace preference factors;
means for determining which user terminals among a plurality of user terminals transmit signals that interfere most with each other;
means for assigning interlace preference factors to the user terminals that transmit signals which interfere most with each other to use different interlaces for transmitting subsequent signals;
means for sending messages to the user terminals to inform them of their assigned interlaces;
means for determining M use terminals, among the L user terminals, that transmit signals which interfere most with each other's signals, M being an integer of at least two;
means for assigning interlace preference factors to the M user terminals to use M different interlaces for transmitting subsequent signals;
means for assigning interlace preference factors to one or more remaining non-assigned L user terminals to use interlaces which the one or more remaining non-assigned L user terminals interfere with the least; and
means for sending messages to the user terminals to inform them of their assigned interlaces.

52. An apparatus comprising:
means for assigning a first interlace preference factor for a first interlace to a first user terminal;
means for assigning a second interlace preference factor for a second interlace to the first user terminal;
means for sending a message to inform the first user terminal of the assigned first and second interlace preference factors;
means for determining which user terminals among a plurality of user terminals transmit signals that interfere most with each other;
means for assigning interlace preference factors to the user terminals that transmit signals which interfere most with each other to use different interlaces for transmitting subsequent signals;
means for sending messages to the user terminals to inform them of their assigned interlaces; and
means for repeating said determining and assigning for each sector of a multi-sector base station.

* * * * *